United States Patent [19]

Brucker

[11] Patent Number: 4,844,800

[45] Date of Patent: Jul. 4, 1989

[54] APPARATUS FOR WASTE WATER TREATMENT

[76] Inventor: Christian Brucker, 58 Grande Rue, VICQ 78490 Montfort L'Amaury, France

[21] Appl. No.: 17,205

[22] Filed: Feb. 17, 1987

[30] Foreign Application Priority Data

Feb. 14, 1986 [FR] France ................. 86-02008

[51] Int. Cl.⁴ ............................. C02F 3/12
[52] U.S. Cl. ................. 210/195.3; 210/208; 210/220; 210/262; 210/527
[58] Field of Search ............ 210/195.3, 201–203, 210/208, 219, 220, 241, 260–262, 521, 527, 530

[56] References Cited

U.S. PATENT DOCUMENTS

| | | | |
|---|---|---|---|
| 3,330,413 | 7/1967 | Danjes | 210/195.3 |
| 3,709,792 | 1/1973 | Hampton . | |
| 3,834,540 | 9/1974 | Bernard | 210/195.3 |
| 3,846,291 | 11/1974 | Brucker . | |
| 4,190,541 | 2/1980 | Wade et al. | 210/241 |
| 4,383,922 | 5/1983 | Beard | 210/521 |
| 4,422,929 | 12/1983 | Owens . | |
| 4,446,018 | 5/1984 | Cernick | 210/521 X |
| 4,652,371 | 3/1987 | Love | 210/521 X |

FOREIGN PATENT DOCUMENTS 0002115  5/1979  European Pat. Off. .
1408663  7/1965  France .
2148886  3/1973  France .

Primary Examiner—Tom Wyse
Attorney, Agent, or Firm—Young & Thompson

[57] ABSTRACT

A method and apparatus for the treatment of waste water. The method comprises a primary sedimentation stage, an activation stage comprising high, medium and then low loading rate oxidation stages, a filtering stage and a clarification stage. All of these stages are performed in a single flat-bottomed parallelepipedal basin. The water treatment apparatus comprises a sludge recirculator (23, 24), an aerator (22, 25), a skirt (26), a filter (29) and a horizontal laminar flow clarifier (27). The clarifier is made up of a succession of inclined baffles (27a) joined together in pairs at their upper and lower edges. Sludge aspirator pipes (28) are provided adjacent the bottoms of the inclined baffles.

12 Claims, 1 Drawing Sheet

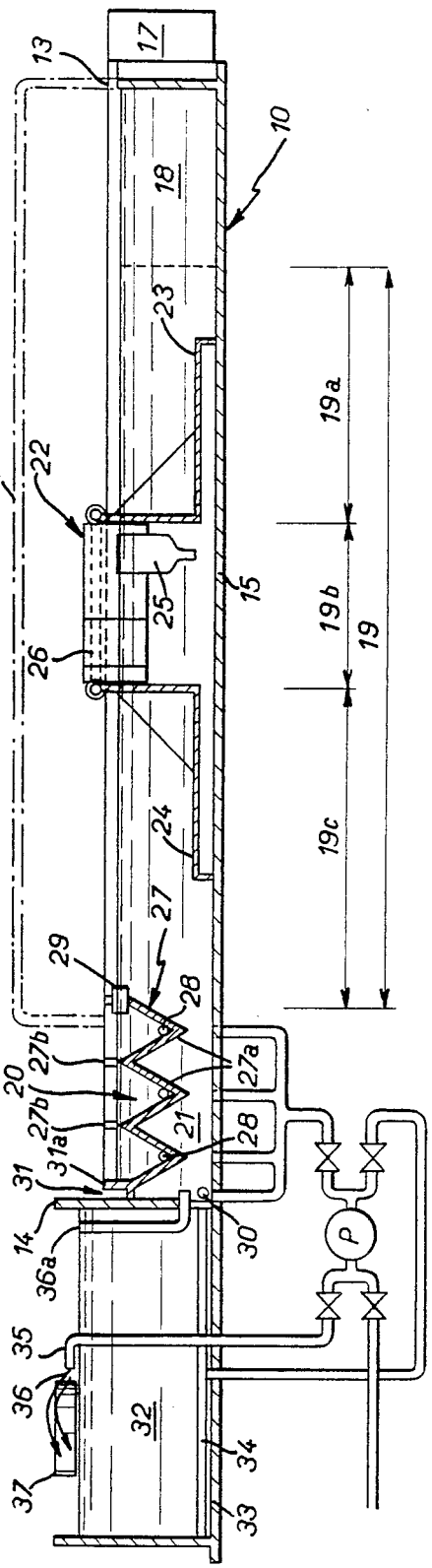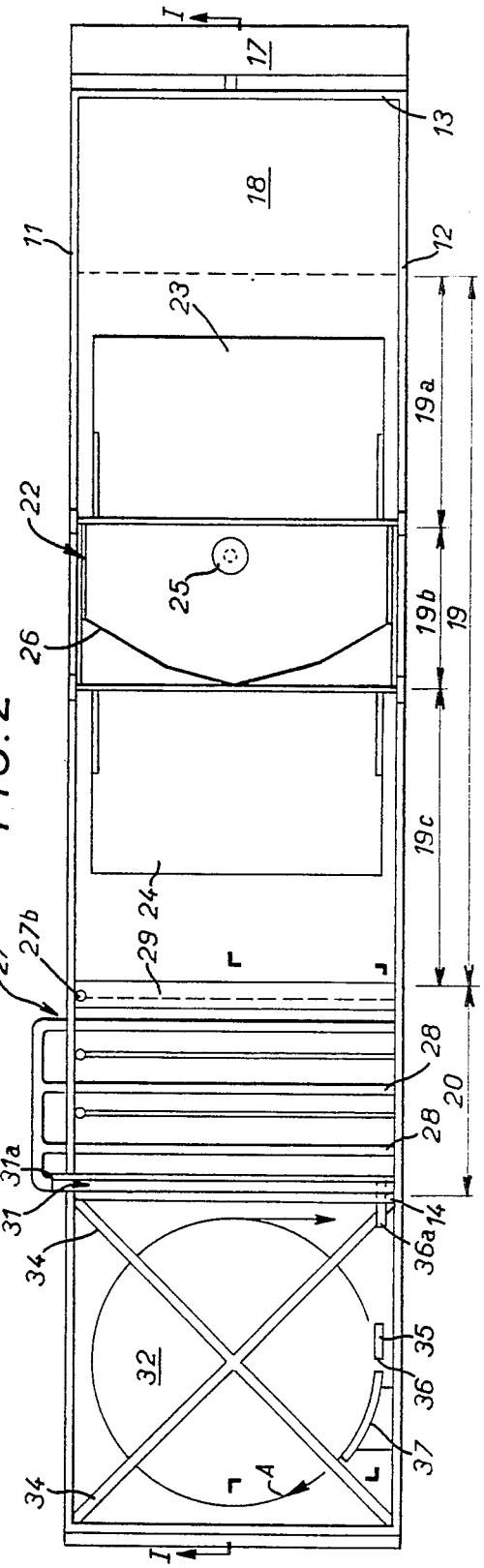

APPARATUS FOR WASTE WATER TREATMENT

The method and apparatus in accordance with the invention concern the treatment of waste water. To be more specific, they are used to improve the purification and clarification of waste water.

There are already known purification stations capable of aerating and clarifying polluted water. As a general rule these purification stations are large and are divided into separate subsystems each having a specific function: namely, an aeration basin and a separate clarification basin.

There are also known smaller purification stations of parallelepipedal shape in which all the operations necessary to purifying the water are executed in the same basin; the purification and clarification of the water treated by these stations still raises problems, however. The microorganisms contributing to the purification of the waste water are operative with low efficiency and also sludge is often seen to rise towards the purified water recovery chute.

An object of the invention is to alleviate all these problems.

To this end, the invention concerns a method of treating waste water that has previously been screened, degreased and degritted and that is contained in a flat-bottomed parallelepipedal cleaning basin, characterized in that it comprises the steps of:
  primary sedimentation of the waste water including recovery and recirculation of the resulting sludge,
  activation by oxygenation at high, medium and then low loading rates as an aerator moves from the upstream end to the downstream end of the basin, and vice versa, and recirculation of the sludge resulting from this activation,
  filtering by means of biological and/or mechanical filters, and
  clarification by means of a horizontal laminar flow clarifier, these various steps being executed in the flat-bottomed parallelepipedal basin and a continuous film of water extending from the upstream wall to the downstream wall of said basin.

The invention also concerns apparatus according to the method as defined hereinabove characterized in that it comprises a sludge recirculator, an aerator, a skirt, a biological and/or mechanical filter and a horizontal laminar flow clarifier comprising a succession of oppositely inclined baffles the upper and lower edges of which are joined together in pairs, the upper edges forming a restriction with the water surface, and the waste water entering said clarifier from above after sedimentation and aeration, optionally after being subjected to a change in level by a device adapted to avoid breaking the continuity of the water film over all of the basin.

Other characteristics and advantages of the invention will emerge from the following description given by way of non-limiting example with reference to the appended drawings in which:

FIG. 1 shows apparatus in accordance with the invention in cross-section on the line I—I in FIG. 2;

FIG. 2 is a plan view of the apparatus in accordance with the invention.

In the selected embodiment shown in FIGS. 1 and 2, a basin 10 for purifying waste water in accordance with the invention is made up of two longitudinal walls 11 and 12 disposed along the length of a parallelepiped, two transverse walls 13 and 14 disposed along the width of the latter, a horizontal flat bottom 15, and an airtight cover 16 adapted to partly cover the basin. The transverse wall 13 forms the end of the so-called upstream part of the basin and the transverse wall 14 forms the end of the so-called downstream part.

The basin is provided upstream of its wall 13 with an area 17 in which the waste water is pretreated and comprises from the upstream end towards the downstream end a primary sedimentation area 18, an activation area 19, a clarification area 20 and a sludge storage area 21.

The pretreatment area 17 is used to screen, degrit and degrease the waste water in a manner that is known of itself and thus will not be described in detail in the context of the present invention.

The primary sedimentation area 18 serves for sedimentation of the pretreated waste water and is distinguished from the activation area 19 by the fact that it is never aerated.

Downstream of the primary sedimentation area 18 (FIGS. 1 and 2) there is located a travelling assembly 22 movable on the upper part of the longitudinal walls 11 and 12 and carrying means for oxidizing the water and recirculating the sedimented substances. These recirculator means include two bottom scrapers 23, 24 disposed one on the upstream side and the other on the downstream side of the oxidation means or aerator 25.

Around the downstream side of the aerator 25 a partially immersed skirt 26 extends in a semicircle substantially from the longitudinal wall 11 to the longitudinal wall 12, and is fastened to the travelling assembly 22, with which it moves.

The clarification area 20 is constituted by a clarifier device or clarifier 27.

The sludge storage area 21 is constituted by the space beneath the clarifier 27.

The clarifier 27 (FIGS. 1 and 2) is made up of a system of oblique baffles 27a inclined at approximately 60° to the horizontal. These baffles are inclined in alternate directions and are joined together at the upper and lower edges. At each pair of lower edges of these baffles there are disposed perforated pipes 28. A partially or totally immersed biological and/or mechanical filter is placed on any one or more of the ridges formed by the oblique baffles 27a. The filter may advantageously be inclined relative to the vertical plane passing through each of the ridges, or it may be vertical.

A perforated pipe 30 for aspirating sludge deposited under the clarifier 27 is placed at the downstream lower end of the basin 10 in the vicinity of the transverse wall 14. The wall 14 has at its upper end a chute 31 for recovering the purified water fitted with a overflow weir 31a. The ridges formed by the oblique baffles 27a carry a vent 27b consisting of a pipe discharging above the level of the water in the basin 10 and establishing communication between the space 21 below the clarifier 27 and the external atmosphere, or any other gas recovery device.

The space 21 constitutes the sludge storage area of the basin.

A sludge storage silo 32 (FIGS. 1 and 2) is advantageously placed near the transverse wall 14 of the parallelepipedal basin 10, either adjacent or farther away from the wall 14. This silo comprises a tank the bottom 33 of which is fitted with perforated sludge aspirator pipes 34. Near the upper surface of the tank there discharges a sludge feed pipe 35 connected to the aspirator pipes 28 and 30, this pipe discharging sludge through its opening 36 onto a circular arc-shaped member or discharge elbow 37. The silo is equipped with an overflow 36a which discharges under the clarifier 27.

The method of purifying the pretreated waste water thus consists in a first stage of primary sedimentation of the waste water, followed by activation or aeration, followed by clarification of the purified water before it is returned into a receiving watercourse or fed to a drinking water supply system (not shown).

These various steps of the water treatment process are described hereinbelow.

The pretreated water is fed into the primary sedimentation area where sedimentation takes place. The sludge gathered by the scrapers 23 and 24 in the primary sedimentation area participates actively and in a primordial way in the treatment of the waste water, as will be explained hereinafter.

The water then flows into the activation area 19. This activation area is made up of a high loading rate oxidation area 19a, then a medium loading rate oxidation area 19b and a sedimentation and low loading rate oxidation area 19c. These various oxidation areas have a "Biochemical Oxygen Demand (BOD)/Biomass" ratio that is successively high, medium and low as the water advances in the basin. Thus gradual purifying of the waste water is achieved and the stabilization gradient of the sludge is also gradual.

The biomass in the basin 10 has oxygen requirements which vary with the cleaning effect that it has to achieve. Immediately after the primary sedimentation area 18 the cleaning effect must be intense, which is why the oxygen demand is high, which explains the necessity to aerate the water strongly. The further the water advances in the basin and the more it is purified the less the oxygen demand. It should be noted, however, that it is not the same microorganisms (biomass) operative in each of the oxidation areas. The cleaner the water, the more complex the microorganisms constituting the biomass.

The aerator 25 draws in water and sludge from the bottom of the basin and sprays it upwards with the mixture (water+sludge) falling back directly into the body of water contained in the basin, in this way supplying oxygen to the microorganisms that are breaking down the organic material.

The aerator moves from the upstream end towards the downstream end and vice versa, being fastened to the device supporting the scrapers 23 and 24. It may operate continuously or during periods of variable duration, according to the cleaning effect required and the type and quantity of waste water treated.

The role of the skirt 26 is to confine turbulence created by the aerator 25 in order to protect from hydraulic turbulence the part on the downstream side of the skirt and so facilitate the sedimentation of material in suspension.

The function of the scrapers 23, 24 is to store the sludge in the form of a sloping embankment in the primary sedimentation area 18 and along the transverse wall 14, and to return part of the sludge to the oxidation areas 19a, 19b, 19c on the return travel of the travelling assembly. These heaps of sludge bring about and facilitate phenomena of denitrification and dephosphatation (elimination of nitrogen and phosphorous) and produce collagen materials and enzymes. These enzymes are necessary for purification of the water.

When the bottom is scraped by the scrapers 23 and 24 the sludge in the lowest rate oxidation area is moved to the higher rate oxidation areas and the sludge resulting from primary sedimentation 18 is replaced with sludge that has been digested in an aerobic medium, which enhances its purifying qualities.

Because of the movement of the travelling assembly and the scrapers the sludge is constantly recirculated and agitated (therefore degassed) in order to participate actively in the purification and to prevent the occurence of the so-called "bulking [sic]" phenomenon due to degassing of stagnant sludge.

Downstream of the skirt 26 the materials contained in the water settle out again. The water is then obliged to pass through a biological and/or mechanical filter 29 the function of which is to separate out microorganisms, debris and sludge that has participated in the purification of the water. This filter 29 may be placed on any one or more of the ridges of the clarifier 27, or even downstream of the clarifier and upstream of a water recovery chute 31 or even downstream of this chute 31. What is essential is for the water to be filtered before it is returned to the natural environment, for example into a watercourse, or fed to a subsequent treatment device such as a drinkable water supply system (not shown), for example.

On entering the clarifier 27 the water flow is laminar and generally horizontal, which causes heavy particles to settle out under their own weight in the bottoms of the alternately inclined baffles 27a, whereas the filtered and clarified water flows to the water recovery chute 31. The function of the upper edges of the oblique baffles 27a is very important. These edges form a restriction with the surface of the water. Passage of the fluid through this restriction favors agglutination of the floc or sludge which makes it denser and the inclination of the baffles 27a favors settling out of the floc which slides along the baffles. Also, the circulation of the currents of fluid up and down along the inclined baffles is properly ordered without giving rise to turbulence. It is therefore beneficial to increase the number of ridges and the number of filtering operations.

The perforated pipes 2B recover the fine sludqe deposited along the baffles 27a by suction or any equivalent means. The vents 27b enable gas accumulating under the clarifier to escape. The reserve 21 of sludge built up under the clarifier releases a significant quantity of gas. This gas can, of course, be recovered for subsequent utilization.

The sludge concentrator silo 32 serves to concentrate the sludge drawn off from the bottom and under the clarifier 27 by the suction pipes 28 and 30. This sludge is fed into the tank of the silo through the pipe 35. The column of water and sludge discharged from the opening 36 of the pipe 35 is oriented by the discharge elbow 37 so as to confer on the mass of liquid a circular impulsion (arrow A) which thus lengthens the trajectory of the injected liquid and therefore increases the time for the sludge to separate out. The supernatant liquor, in which the concentration of sludge is low, is taken off just upstream of the discharge elbow 37 by the overflow 36a the pipe from which discharges into the treatment basin 10 for further purification.

The system of suction pipes 34 situated on the raft of this installation is used to draw off excess sludge where this is present with the maximum concentration. The sludge drawn off may be used as fertilizer, for example, and shipped for spreading on agricultural land.

It is also possible to draw off directly the sludge accumulated under the clarifier 27 for use as fertilizer using a known type system of two-way and three-way valves. All these drawing off operations are advantageously effected by a pump P.

Thus all operations involved in purifying the water are carried out in the same installation with an entirely flat bottom and an extremely elongate, generally parallelepipedal shape. The water for purifying imperatively passes through the various purifying stages. In each stage the fluid currents are ordered in a precisely determined and rational way.

An important advantage of the method is the elimination of nitrogen and phosphorous when the sludge is recirculated. The oxidation part of the basin produces nitrites and nitrates. When the sludge is recirculated by the scrapers of the travelling assembly, either in the primary sedimenttion area or in the reserve of biomass downstream and under the clarifier, denitrification occurs because of the change from aerobic to anaerobic conditions, which results in phenomena leading to the elimination of nutrients (nitrogen, phosphorous, etc).

However, it should be noted that the skirt 26, rather than being fixed to the travelling assembly 22, may instead be fixed to the longitudinal walls 11 and 12 in a permanent or removable manner. The skirt is always located upstream of the clarifier 27 and downstream of the aerator 25, of course.

It should be noted that the aerator 25 may be used to procure sedimentation upstream of the clarifier 27, in a way that is known per se. The aerator 25 sprays above the water a mixture of water and sludge which falls back into the water to form a layer of sludge on the surface. As the aerator moves this layer of sludge sinks slowly towards the bottom of the basin, trapping as it goes some of the particles in suspension in the water. This brings about presedimentation of the waste water before it enters the clarifier 27.

With regard to the clarifier, and unlike the prior art in this respect, the water to be clarified enters from above rather than from below, the advantage of which is a significant reduction in the surface area of the clarifier and improved reliability.

A conventional clarifier is dimensioned according to its surface loading rate (CS) which is defined by the equation:

$$CS = Q/S \simeq 2 \times 10^{-4} \text{ m/s}$$

in which Q is the inlet flowrate and S is tee surface area of the clarifier.

The clarifier in accordance with the invention makes it possible to dispense with this type of calculation since it is of the horizontal laminar flow type and the surface area to be taken into consideration is no longer the surface area of the clarifier only but that of the body of water starting from the upstream wall of the basin as far as the chute 31. Thus for the same inlet flowrate as conventional installations the intrinsic surface area of the clarifier may be significantly reduced, among other things because it is necessary to take into account the existence of the surface areas for the primary sedimentation phase and the oxidation phase. Thus the surface loading rate is determined by all of the surface area of the basin from the activation area 19 to the overflow weir 31a and not just by the surface area proper of the clarifier, that is to say from the most upstream baffle 27a to the overflow weir 31a.

What is essential for the clarifier to function correctly is for the basin 10 to be designed in such a way that the film of water is continuous from the upstream wall 13 of the basin up to the chute 31. This continuity does not necessarily imply that the surface of the water between these two limits is at the same level all along the length of the basin. There are devices (overflow weirs, for example) which make it possible for the level to be different in two consecutive pools without this breaking the continuity of the water film.

It should be noted that the clarifier in accordance with the invention has a two-fold function. Firstly, a clarification function which is implemented by the volume of water above the baffles 27a, and secondly a sludge storage function implemented by the space 21 below these same baffles.

The filter or filters 29 may advantageously be inclined upstream relative to the vertical plane passing through each of the ridges of the clarifier 27, or vertical. These arrangements make it possible to exploit the swirl phenomena that are observed on passing over the ridges of the clarifier, to make the filters 29 vibrate slightly and so ensure spontaneous declogging thereof. Inclining the filters also facilitates declogging and encourages the trapped particles to fall off.

It should be noted that the lengthwise arrangement of the basin makes it possible to add products participating in the purifying action at the appropriate time anywhere over the limits of the basin; these products include flocculating agents such as sulfate of alumina, ferrous chloride, dichlorosulfate, disinfectants or any other product of any kind (solid, liquid or gas). The cover 16 or confinement hood that may cover the basin 10 is airtight and fits over the primary sedimentation area 18 and the oxidation areas 19a, 19b and 19c. It may equally well extend over any one or more of the areas 18, 19a, 19b, 19c and 20. A specific mixture of gasses may advantageously be enclosed under this cover: for example, to accelerate the purification process it may be executed under a pure oxygen atmosphere. On the other hand, it is possible to avoid using the aerator 25 once the basin is functioning anaerobically, in which case there occurs release of low-grade gasses of the methane, hydrogen sulfide and equivalent type. The cover then serves as a receptacle for these gasses which may be regularly drawn off and used to produce energy, for example.

However, it should be noted that if a cover is used the drive motor of the travelling assembly 22 is situated externally of the cover to eliminate the risk of explosion due to accumulation of gas under the cover; the place where the motor drive shaft passes through the cover is then made airtight by incorporating bearings into the wall of the cover.

It is sometimes necessary to cover part or all of the basin 10, if working at low temperature and in order to protect against frost, for example.

It is to be understood that the present invention is not limited to the embodiment described and it is possible to envisage variants without departing from the scope of the invention; specifically, it is possible to feed the water flowing out through the chute 31 back into the purification plant at any one or more points. The addition of this nitrate-rich water makes it possible to bring about further denitrification which enhances the purification process.

What I claim is:

1. Apparatus for treating waste water previously degritted, screened and degreased, comprising
   a single, flat-bottomed, uncompartmented cleaning basin, means for introducing waste water at an upstream end of said basin, means for evacuating clarified water at a downstream end of said basin, said basin having a primary sedimentatioin zone proximate its upstream end, a clarification zone proximate its downstream end, and an activation zone between said primary sedimentation zone and said clarification zone, said clarification zone comprising an upper portion for clarification of said waste water and a lower portion of collection of sludge, said upper portion of said clarification zone comprising a clarifier having a succession of oppositely inclined baffles which form alternating peaks and troughs generally perpendicular to the direction of the flow of waste water from the upstream end towards the downstream end of the basin, an aerator mounted for reciprocating movement in said activation zone for operation only in said activation zone, a sludge recirculator mounted for reciprocating movement between said primary sedimentation zone and said lower portion of said clarification zone for recirculating sludge in said primary sedimentation zone, in said activation zone and in said lower portion of said clarification zone alternately from said upstream end of said basin towards said downstream end of the basin and from said downstream end of said basin towards said upstream end, and means for evacuating clarified water from said basin.

2. Apparatus according to claim 1, further comprising means for confining turbulence produced by said aerator and mounted for movement therewith.

3. Apparatus according to claim 2, wherein the aerator is fastened to a travelling assembly, said means for confining turbulence produced by said aerator being fixed to the travelling assembly.

4. Apparatus according to claim 3, wherein the recirculator and the aerator are supported by a single travelling assembly.

5. Apparatus according to claim 1, wherein the peaks of said clarifier form a shallow flow path for surface water.

6. Apparatus according to claim 5, further comprising means defining an inlet for activated waste water at an upstream most peak of said clarifier adapted to prevent the breaking of continuity of the water surface between said activatioin and clarification zones, the direction of the water flow in the clarifier and in the basin being the same.

7. Apparatus according to claim 1, wherein said clarifier includes perforated pipes for aspirating sludge in the proximity of said troughs.

8. Apparatus according to claim 1, in which said clarification zone includes gas venting means to recover gas released by the sludge collected in the clarifier.

9. Apparatus according to claim 1, wherein said clarifier includes a filter disposed on one or more of said peaks in said clarifier.

10. Apparatus according to claim 9, wherein said filter is disposed on the upstream side of said clarifier.

11. Apparatus according to claim 9, wherein said filter is disposed on the downstream side of said clarifier.

12. Apparatus according to claim 1, wherein said sludge recirculator comprises two bottom scrapers displaceable along the bottom of said basin in one direction until one said scraper contacts the downstream end of the basin, and then in an opposite direction until another said scraper contacts the upstream end of the basin, said scrapers being shaped to form inclined areas of sludge along opposite ends of the basin and to return part of the sludge to the center of the activation zone.

* * * * *